US009485258B2

United States Patent
Delany

(10) Patent No.: US 9,485,258 B2
(45) Date of Patent: Nov. 1, 2016

(54) MEDIATION SYSTEM AND METHOD FOR RESTRICTED ACCESS ITEM DISTRIBUTION

(75) Inventor: Mark Delany, Sunnyvale, CA (US)

(73) Assignee: OPENWAVE MOBILITY, INC., Redwood City, CA (US)

( * ) Notice: Subject to any disclaimer, the term of this patent is extended or adjusted under 35 U.S.C. 154(b) by 617 days.

(21) Appl. No.: 13/371,158

(22) Filed: Feb. 10, 2012

(65) Prior Publication Data

US 2012/0209778 A1    Aug. 16, 2012

Related U.S. Application Data

(60) Provisional application No. 61/442,265, filed on Feb. 13, 2011.

(51) Int. Cl.
*H04L 9/00* (2006.01)
*H04L 29/06* (2006.01)

(52) U.S. Cl.
CPC ......... *H04L 63/102* (2013.01); *H04L 63/0442* (2013.01); *H04L 63/12* (2013.01); *H04L 2463/102* (2013.01)

(58) Field of Classification Search
None
See application file for complete search history.

(56) References Cited

U.S. PATENT DOCUMENTS

| | | | |
|---|---|---|---|
| 6,029,150 A * | 2/2000 | Kravitz | 705/39 |
| 6,226,618 B1 * | 5/2001 | Downs et al. | 705/51 |
| 6,236,981 B1 * | 5/2001 | Hill | 705/67 |
| 6,947,908 B1 * | 9/2005 | Slater | 705/51 |
| RE40,444 E * | 7/2008 | Linehan | 705/65 |
| 8,019,691 B2 * | 9/2011 | Dominguez et al. | 705/78 |
| 8,060,448 B2 * | 11/2011 | Jones | 705/65 |
| 2003/0005735 A1 | 1/2003 | Gasparini | |
| 2003/0046178 A1 | 3/2003 | Chao | |
| 2004/0243477 A1 | 12/2004 | Mathai et al. | |
| 2007/0073629 A1 * | 3/2007 | Montero et al. | 705/74 |
| 2009/0057396 A1 * | 3/2009 | Barbour et al. | 235/379 |
| 2010/0161818 A1 | 6/2010 | Capuozzo et al. | |
| 2010/0229225 A1 | 9/2010 | Sarmah et al. | |
| 2011/0251892 A1 * | 10/2011 | Laracey | 705/14.51 |
| 2012/0173431 A1 * | 7/2012 | Ritchie et al. | 705/65 |

FOREIGN PATENT DOCUMENTS

KR    20050019454 A1    3/2005

OTHER PUBLICATIONS

Vlad Savov; "WSJ: Google plans a 'digital newsstand' to unite all newspapers and magazines under Android's umbrella"; http://www.engadget.com/2011/01/02/wsj-google-plans-a-digital-newsstand-to-unite-all-newspapers/; Jan. 2, 2011.

* cited by examiner

*Primary Examiner* — John Hayes
*Assistant Examiner* — Tim Hale

(57) ABSTRACT

Mediation systems and methods for restricted access item distribution are disclosed. In an embodiment, a method for facilitating payment from a user device for a restricted access item hosted by a host system is disclosed. In another embodiment, a system for facilitating payment from a user device to for a restricted access item hosted by a host system is disclosed. In another embodiment, a method for providing a mediated marketplace service is disclosed.

17 Claims, 7 Drawing Sheets

MEDIATION SYSTEM AND METHOD FOR RESTRICTED ACCESS ITEM DISTRIBUTION

CROSS-REFERENCE TO RELATED APPLICATION

This application is entitled to the benefit of provisional U.S. Patent Application Ser. No. 61/442,265, filed Feb. 13, 2011, entitled "Mediation system and method for restricted access item distribution," which is incorporated by reference herein.

BACKGROUND

When a user of a device wishes to access items with restricted access that are hosted by a host system, such as webpages containing content that requires payment, the user typically has to overcome a paywall erected by the host system. Such a paywall usually requires the user to fill out online forms and supply payment information and personal information. However, this paywall creates a very high 'barrier to entry' to the user and might deter many users from purchasing restricted access items from a host system. There are many risks and inconveniences involved in accessing the restricted access items through a paywall, such as abuse of the payment information, misuse of the personal information and disclosure of the information to third parties. Furthermore, the paywall typically requires registration information such as a login name and password, which requires the user to remember the login credentials for every host system. Therefore, many users to do not cross this paywall, thus reducing the potential revenue for the host systems.

SUMMARY

Mediation systems and methods for restricted access item distribution are disclosed. In an embodiment, a method for facilitating payment from a user device for a restricted access item hosted by a host system is disclosed. The method involves receiving, at an access network, a response message from the host system, the response message being initiated in response to a request message sent from the user device to the host system, the request message being related to the restricted access item hosted by the host system. The method further involves determining whether the host system participates in the mediated marketplace service and sending a modified response including a payment assurance token to the user device if the content provider participates in the mediated marketplace service, the payment assurance token indicating whether the host system will get paid for the restricted access item. The payment assurance token enables the user device to receive the restricted access item from the host device if the payment assurance token indicates that the host system will receive a financial compensation for the restricted access item.

In another embodiment, a system for facilitating payment from a user device to for a restricted access item hosted by a host system is disclosed. The system includes a processor and a memory for storing executable instructions, which when executed by the processor perform steps including, receiving, at an access network, a response message from the host system, the response message being initiated in response to a request message sent from the user device to the host system, the request message being related to the restricted access item hosted by the host system, determining whether the host system participates in the mediated marketplace service, and sending a modified response including a payment assurance token to the user device if the content provider participates in the mediated marketplace service, the payment assurance token indicating if the host system will get paid for the restricted access item. The payment assurance token enables the user device to receive the restricted access item from the host device if the payment assurance token indicates that the host system will receive financial compensation for the restricted access item.

In another embodiment, a method for providing a mediated marketplace service is disclosed. The method involves enabling a host system to register with a settlement exchange and at the settlement exchange, providing a cryptographically signed authorizer to the host system upon completed registration of the host system. The method further involves enabling a mediation system to register with the settlement exchange and at the settlement exchange, providing a cryptographically signed payment assurance token to the mediation system upon completed registration of the mediation system. The payment assurance token enables the mediation system to send a restricted access item hosted by the host system to a user device as a result of the user device sending a request for the restricted item to the host system, the mediation system provides payment to the host system for the restricted access item through the settlement exchange, and the mediation system charges the user device for the restricted access item.

Other aspects and advantages of embodiments of the present invention will become apparent from the following detailed description, taken in conjunction with the accompanying drawings, illustrated by way of example of the principles of the invention.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

Figure 1:
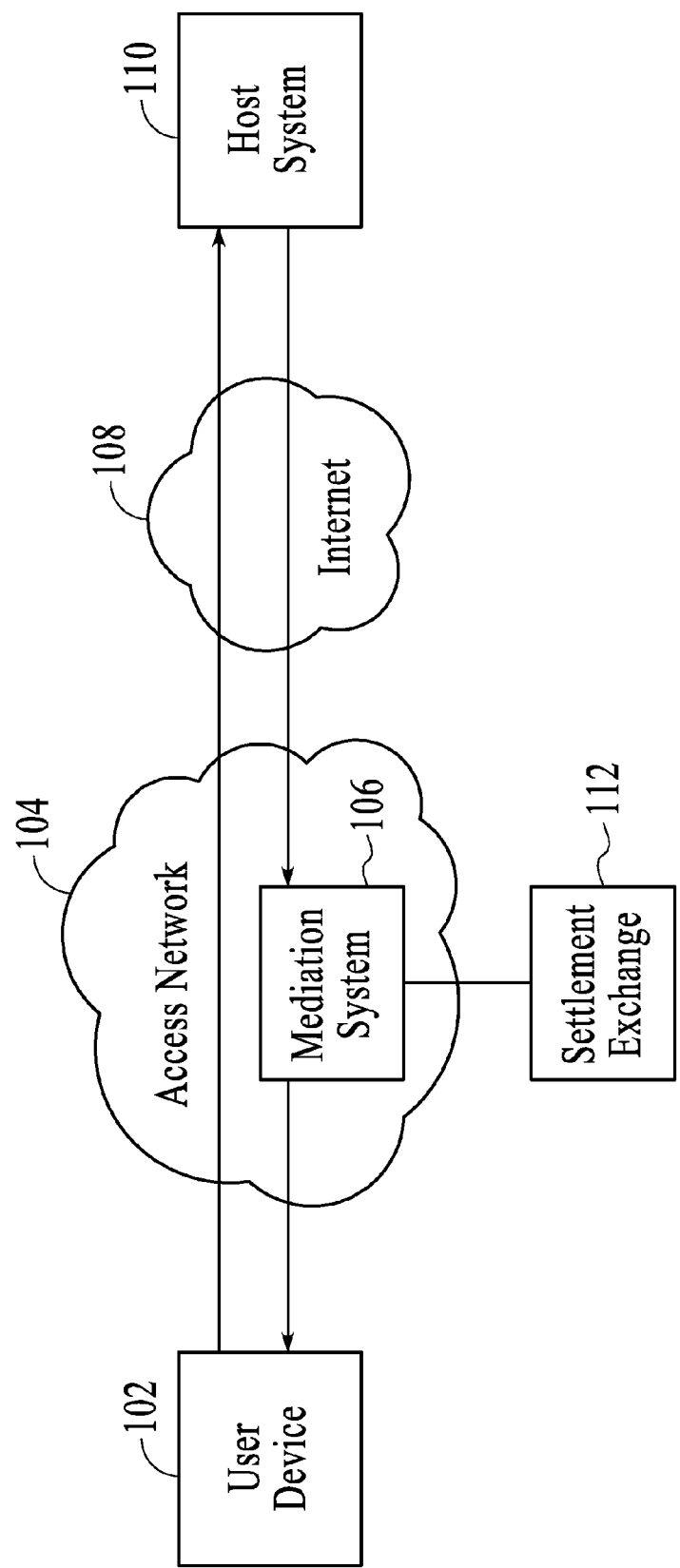
FIG. 1 depicts a system for transferring communications between a user device and a host system in accordance with an embodiment of the invention.

FIG. 1 depicts a system for transferring communications between a user device 102 and a host system 110 in accordance with an embodiment of the invention. The user device is connected to the host system through an access network 104 and through the Internet 108. The system of FIG. 1 may include more than one user device and more than one host system connected to each other through the access network.

The user device 102 is a network enabled device including, without limitation, a mobile phone, smart phone, personal digital assistant (PDA), laptop, tablet, or personal computer (PC). In one embodiment, the user device is a wireless device that can support various different RF communications protocols, including without limitation, Global System for Mobile communications (GSM), Universal Mobile Telecommunications System (UMTS), Code Division Multiple Access (CDMA), Worldwide Interoperability for Microwave Access (WiMax) and communications protocols as defined by the 3$^{rd}$ Generation Partnership Project (3GPP) or the 3$^{rd}$ Generation Partnership Project 2 (3GPP2), 4G Long Term Evolution (LTE) and IEEE 802.16 standards bodies. Although some wireless communications protocols are identified herein, it should be understood that the present disclosure is not limited to the cited wireless communications protocols.

The user device 102 accesses the host system 110 by connecting to the Internet 108 via the access network 104. For example, an HTTP request for a restricted access item that is hosted or provided by the host system 110 is generated at the user device and is transmitted to the host system over a Transmission Control Protocol/Internet Protocol (TCP/IP) connection through the access network and the Internet. In one embodiment, the restricted access item is a content element hosted or accessible by the host system and suitable to be transferred in a networked environment, such as markup language files, scripting language files, video files, music files, image files or other data files. In a non-limiting example, the content element includes HTML files of an online newspaper that charges for access to premium content. In another embodiment, the restricted access item is a physical object that can be purchased at, for example, a website of the host system and possibly shipped to a physical address provided to the host system at the time of purchase. The steps for purchasing the physical product are typically identical to the steps for purchasing digital content elements, but instead of sending the digital content element via an internet connection, the physical object is sent to the physical address via a postal service or courier. In yet another embodiment, the item is a service, such as an intangible equivalent of an economic good (physical object).

The access network 104 provides a communications interface for the user device 102 to access the Internet 108. Typical access networks include wireless service provider networks (e.g., that offer 3G, 4G and/or WiFi access) and ISPs (e.g., that offer dial-up, DSL, and/or cable modem access). A private enterprise network can also serve as the access network if client devices within the private enterprise network can access the Internet through the private enterprise network.

In one embodiment, the access network 104 is a wireless service provider network that provides a wireless communications interface for the user device 102 (e.g., wireless device such as a smartphone or tablet). In an embodiment, the wireless service provider network is accessible on a subscription basis (e.g., prepaid or post-paid) as is known in the field. In one embodiment, the wireless service provider network is a closed domain that is accessible only by subscribers (e.g. users of the user device) that are in good standing with the operator of the wireless service provider network. The wireless service provider network may include a radio access network (not shown) and an Internet gateway (not shown). The radio access network includes one or more base stations to facilitate communications among wireless devices that are within a communication range of the base stations. Each base station has at least one RF transceiver and the base stations communicate with the wireless devices using RF communication signals. The radio access network facilitates network communications among multiple wireless devices within the same wireless service provider network and between wireless devices in other wireless service provider networks and provides interfaces to facilitate communications with other entities, such as a Public Switched Telephone Network (PSTN), a Wide Area Network (WAN), the Internet, Internet servers, hosts, etc., which are outside of the wireless service provider network. In an embodiment, the wireless service provider network is operated by a single wireless service provider, such as, for example, AT&T, VERIZON, T-MOBILE, or SPRINT. In one embodiment, the wireless service provider has exclusive access to and control over the wireless service provider network.

Data signals communicated between the user device 102 and the access network 104 include, but are not limited to, analog and/or digital RF signals (i.e., radio waves) for any type of communication mode, including text messaging, multimedia messaging, voice calling, and Internet browsing. The radio access network (not shown) can support various different RF communications protocols, including without limitation, GSM, UMTS, CDMA, WiMax and communications protocols as defined by 3GPP, 3GPP2, or IEEE 802.16.

Although some wireless communications protocols are identified herein, it should be understood that the present disclosure is not limited to the cited wireless communications protocols.

The Internet gateway (not shown) of the access network 104 provides a gateway for communications between the wireless device and Internet-connected hosts and/or servers, which can also be referred to as the "cloud." The Internet gateway may include a Serving General Packet Radio Service (GPRS) Support Node (SGSN) and a Gateway GPRS Support Node (GGSN). For example, the Internet gateway can be a Wireless Application Protocol (WAP) gateway that converts the WAP protocol used by the access network (such as a wireless service provider network) to the HTTP protocol used by the Internet. In an embodiment, the Internet gateway enables the wireless devices to access multimedia content, such as HTML, compact HTML (cHTML), and extensible HTML (xHTML), which is stored on Internet-connected hosts and/or servers. In this way, the access network provides access to the Internet for its subscribers.

The host system 110 is any device or system that provides a way to purchase a restricted access item. In one embodiment, the host system is an Internet-connected host or server that is identified by a URI or a URL and that hosts Internet-accessible content elements. Host systems are well known in the field. The host system is, for example, a web server that can be accessed via Hypertext Transfer Protocol (HTTP), Internet Message Access Protocol (IMAP), or File Transfer Protocol (FTP).

The mediation system 106 is located in the access network 104 and is in the data path of communications between the host system 110 and the user device 102. In one embodiment, the mediation system intercepts data streams (e.g., response messages) sent from the host system to the user device. In another embodiment, the mediation system intercepts data streams to and from the user device and the host system. The mediation system is further operatively coupled to a settlement exchange 112 and the mediation system may be implemented in hardware and/or software.

The settlement exchange 112 is a device, system or instructions executed by a processor. The settlement exchange is typically located outside of the access network and more than one access network may be connected to the settlement exchange and vice-versa. In one embodiment, the settlement exchange is a certificate authority. In another embodiment, the settlement exchange is controlled by a financial institution or a credit card company. The settlement exchange allows the mediation system 106 and the host system 110 to register with the settlement exchange to make payments and provide access to restricted access items hosted by the host system. In an embodiment, the settlement exchange provides assurances that payment claims and access grant claims will be met by the mediation system and by the host system. The settlement exchange is typically responsible for settling payments from the mediation system to the host system and provides billing information for the mediation system to supply to the user devices.

In operation, the mediation system 106 and the settlement exchange 112 provide a mediated marketplace service to facilitate the purchase by the user device 102 of the restricted access items provided by the host system 110. Before participating in the mediated marketplace service, the host system and the mediation system register with the settlement exchange, as described below with reference to FIG. 2. In one embodiment, the user device browses to a website hosted by the host system and selects a restricted access item that requires purchase. Subsequently, the host system sends a response that is intercepted by the mediation system. Based on the intercepted message, the mediation system determines whether the host system participates in the mediated marketplace service. If the host system participates in the mediated marketplace service, the mediation system provides the host system with proof of the mediation system's participation in the mediated marketplace service. In one embodiment, upon validation of proof of the mediation system's participation in the mediated marketplace service, the host system sends the selected restricted access item to the user device, and the user device is charged by the access network for the purchased restricted access item, for example by adding a line item to a monthly service bill (e.g., phone bill) for the user device. In another embodiment, upon validation of proof of the mediation system's participation in the mediated marketplace service, the host system sends a proof of purchase or equivalent notification to the user device and sends the restricted access item via postal service or courier to a specified physical address in the case of the restricted access item being a physical object. In yet another embodiment, a service is provided as a result of validation of proof of the mediation system's participation in the mediated marketplace service. Thus, the mediation system transparently allows the user device to access a restricted access item without the need for the user device to first connect to a third party marketplace. The user device directly requests the restricted access item by, for example, browsing to a webpage of the host system and can then purchase the restricted access item without having to provide payment details to the host system. In an embodiment, payment for the restricted access item occurs from the mediation system to the host system through the settlement exchange. The mediated marketplace service provides a frictionless paywall to the user device by taking advantage of the pre-existing billing relationship between the mediated system and the user device and by enabling the user device to receive the restricted access item from the host system and to be charged for the restricted access item by the mediated system.

Figure 2:
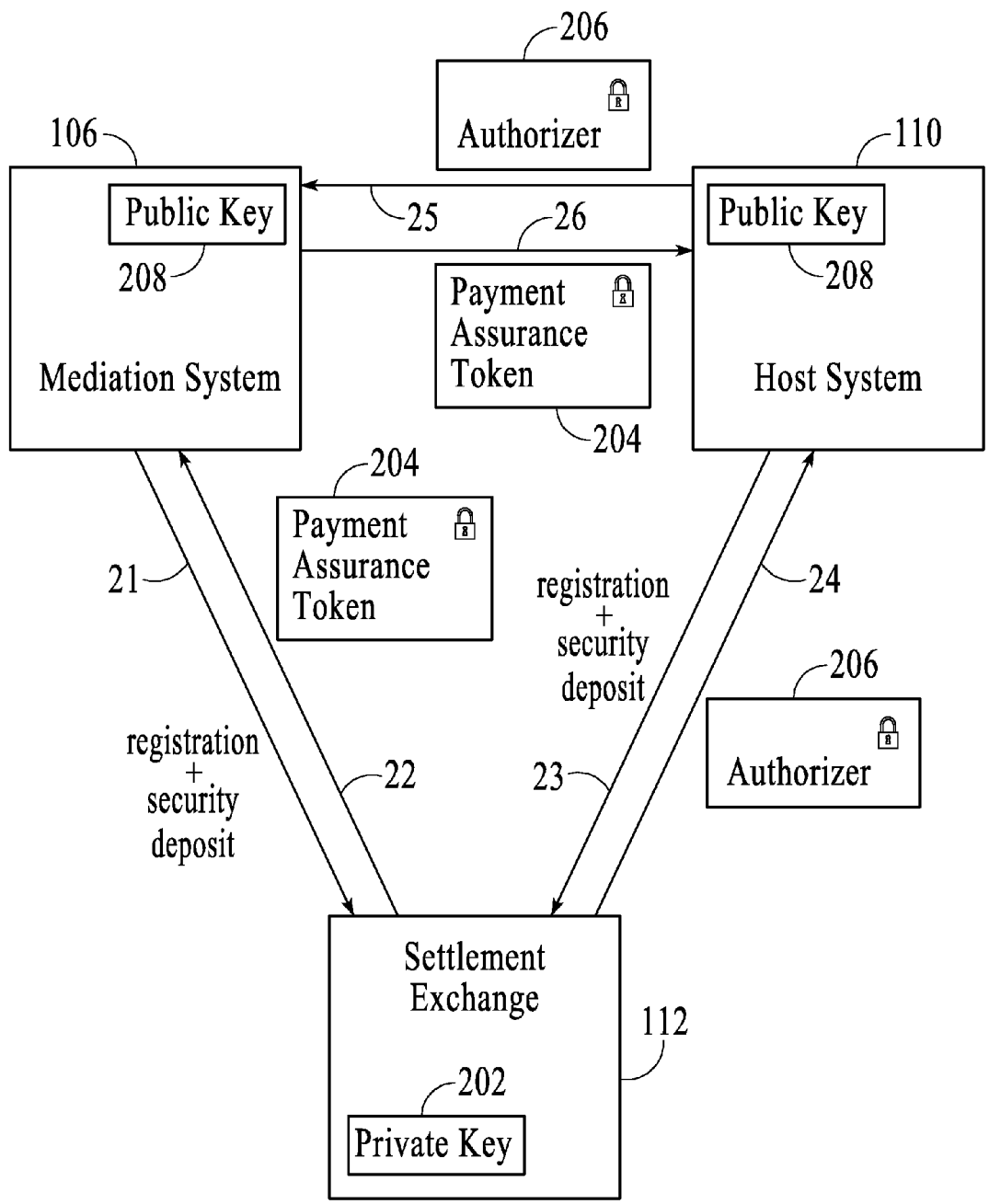
FIG. 2 depicts interactions between a mediation system, a settlement exchange, and the host system.

FIG. 2 depicts the interactions between the mediation system 106, the settlement exchange 112 and the host system 110. In the example of FIG. 2, the mediation system registers with the settlement exchange (as indicated by arrow 21). In one embodiment, the mediation system is provided with a cryptographically signed payment assurance token 204 after registration (as indicated by arrow 22). The cryptographically signed payment assurance token is created by the settlement exchange using a private key 202 and the payment assurance token can be decrypted using a public key 208 that is available to the mediation system and the host system. The public key 208 and the private key 202 represent a public/private key pair, whereby only the payment assurance token encrypted with the private key can be decrypted with the public key. In one embodiment, the payment assurance token is an SSL certificate.

Similarly, upon registration of the host system 110 with the settlement exchange 112 (as indicated by arrow 23), the host system is provided with a cryptographically signed authorizer 206 (as indicated by arrow 24). The authorizer is, for example, encrypted by the settlement exchange using the private key 202 and can be decrypted using the public key 208. In one embodiment, the authorizer 206 is signed using a private key that is different from the private key used to sign the payment assurance token 204 and the authorizer and the payment assurance token are decrypted with different public keys. In an embodiment, the authorizer is a data set that includes information about the restricted access item and about the host system, and the authorizer allows the mediation system to determine if the host system is in good standing with the settlement exchange.

In one embodiment, the host system 110 sends the authorizer 206 to the mediation system 106 (as indicated by arrow 25), the authorizer being encrypted by the settlement exchange 112 using the private key 202. A corresponding public key of a public/private key pair, such as public key 208, is made available to the mediation system and can be used by the mediation system to decrypt the authorizer and verify that the authorizer was issued by the settlement exchange. The public key 208 will only decrypt and therefore verify the authorizer if the authorizer was signed/encrypted with the private key 202 by the settlement exchange.

In the example of FIG. 2, the mediation system 106 sends the payment assurance token 204 to the host system 110. A valid payment assurance token (i.e., that is verified to be signed by the settlement exchange) represents an assurance to the host system that the restricted access item will be paid for by the settlement exchange 112. In one embodiment, the settlement exchange charges a fee on the transactions from the mediation system to the host system via the settlement exchange.

In one embodiment, the mediation system 106 transfers a security deposit to the settlement exchange 112. The security deposit is, for example, transferred electronically through a wire transfer or other type of electronic fund transfer. In requiring a security deposit during registration, the settlement exchange can ensure that the mediation system does not assure payment for an amount greater than the amount of the security deposit. Equally, the settlement exchange can require the host system 110 to provide a security deposit during registration. The security deposit of the host system is such that the host system cannot accept payment assurance tokens corresponding to a total value in excess of the security deposit, thereby preventing the host system from accepting more payment assurance tokens than the number of restricted access items that are delivered to the user devices. In one embodiment, the mediation system periodically pays an aggregate amount to the settlement exchange in order to be able to fetch new payment assurance tokens.

In one embodiment, the authorizer includes an expiration time, which indicates the date and time until which the authorizer is valid. After the expiration time, the authorizer should not be accepted by the mediation system and the host system should request a new authorizer in order to be able to provide restricted access items to the mediation system via the mediated marketplace. A valid authorizer within the expiration time indicates that the host system has provided enough of a deposit to the settlement exchange to accept payment for restricted access items, and that the host system therefore is in good standing with the settlement exchange. The expiration time of the authorizer is encrypted with the private key 202 such that the expiration time cannot be tampered with and such that only the settlement exchange can set the expiration time. Only authorizers that can be decrypted with the public key 208 (corresponding to the public key counterpart to the private key 202) indicate to the mediation system that the authorizer has not been tampered with.

In one embodiment, the payment assurance token 204 includes an encrypted expiration time that cannot be tampered with. The host system should not accept an expired payment assurance token and should not send the restricted access item to the user device 102.

Figure 3:
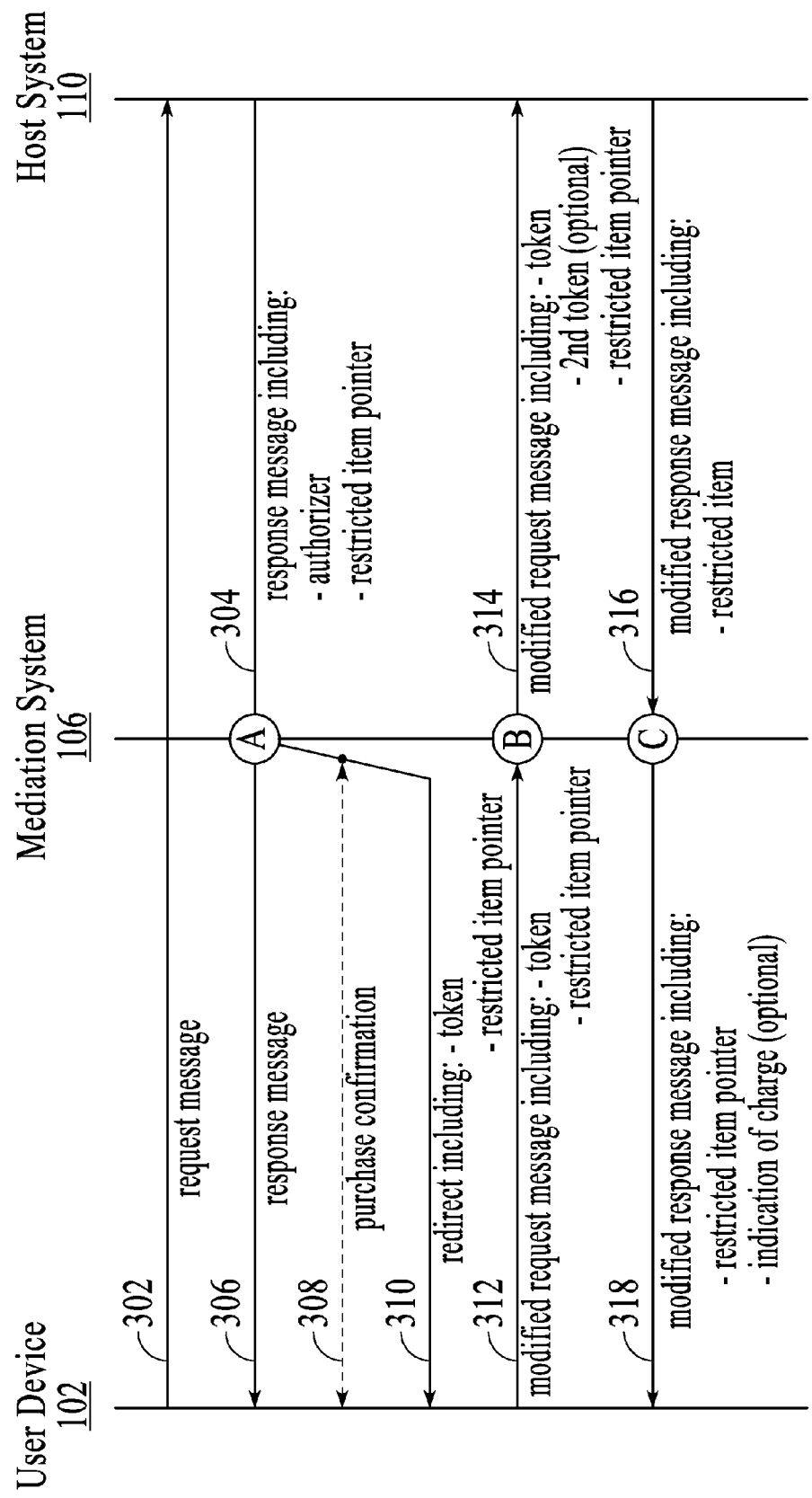
FIG. 3 depicts communications between the user device, the host system, and the mediation system.

FIG. 3 depicts communications between the user device 102, the host system 110, and the mediation system 106. In the example of FIG. 3, the user device sends a request message 302 to the host system for a restricted access item hosted by the host system. The request message is, for example, initiated as a result of a user of the user device browsing to a website of the host system and selecting a hyperlink for the restricted access item. The mediation system is typically not involved in the transfer of the request message from the user device and the host system. Thus, a transparent browsing experience is created for the user device, where the user device can select the restricted access item without first going through a marketplace or another third party webpage. As a result of receiving the request message, the host system sends a response message 304 designated for the user device via the mediation system. The mediation system intercepts the response message and determines (at point A), based on the response message, whether the host system participates in and is in good standing with the settlement exchange. In one embodiment, the response message includes an encrypted authorizer and the determination is based on information contained in the encrypted authorizer. For example, the mediation system can decrypt the authorizer using the public key and, if the decryption was successful, can check the validity of the authorizer. If the host system does not participate in the mediated marketplace service or if the authorizer is not valid (e.g., cannot be decrypted and/or is expired), the mediation system can send a response message 306 to the user device. The response message 306 is typically the same as the response message 304 and leads the user device to a paywall of the host system where the user device can purchase the restricted access item directly from the host system. If the mediation system 106 determines that the host system 110 participates in the mediated marketplace service and that the authorizer is valid, the mediation system initiates the mediated marketplace service. As a result of initiating the mediated marketplace service, the user device does not need to hurdle the paywall of the host system (e.g., by supplying login credentials and payment details), thereby creating a more efficient and transparent experience to the user device for purchasing the restricted access item.

In one embodiment, the mediation system 106 determines whether a purchase confirmation 308 from the user device 102 is required before proceeding with the mediated purchase of the restricted access item. The purchase confirmation can be required if the user of the user device has not previously consented to be charged by the mediation system for the restricted access item associated with the authorizer. In a non-limiting example, the purchase confirmation can be obtained using an interstitial web page or pop-up prompting the user to approve the purchase of the restricted access item. If the user declines the purchase, the response message 304 is typically sent to the user device. In one embodiment, the host system provides product pricing details for the restricted access item to the settlement exchange and the purchase confirmation includes the pricing details obtained from the settlement exchange, thus preventing the host system from modifying the amount charged for the restricted access item.

After the mediation system 106 determines that the host system 110 participates in the mediated marketplace service and that the authorizer is valid (and in some embodiments that the purchase is approved), the mediation system sends a redirect message 310 to the user device 102. The redirect message allows the user device to request the restricted access item without having to go through the paywall of the host system, and as a result the user device is not required to provide payment method details to the host system. Instead, payment is made through the mediation system, for example by adding a line item to the bill of the user device, and the bill is provided by the mediation system. The mediation system is located in the access network, which typically already knows the payment details for the user device. Thus, it is typically not necessary for the user device to resupply the payment details to the mediation system.

The redirect message 310 includes the payment assurance token that was provided to the mediation system 106 as described with reference to FIG. 2. In one embodiment, the redirect message further includes a pointer to the restricted access item, such as a URL. The user device 102 typically accepts the redirect message without requiring any action from the user of the user device, and the user device generates a modified request message 312 based on the information contained in the redirect message. The modified request message includes the payment assurance token and is directed to an address given by the pointer to the restricted access item.

In one embodiment, the modified request message 312 is sent from the user device 102 to the host system 110 without being further modified by the mediation system 106, and the mediation system can be bypassed completely and the restricted access item can be obtained from the host system once the host system determines that the payment assurance token is valid. In another embodiment, the mediation system intercepts the modified request message (at point B). In this embodiment, the payment assurance token included in the redirect message 310 and the modified request message 312 represent a first part of a cryptographically bound payment assurance token pair. Both parts of the payment assurance token pair have to be provided to the host system in order for the host system to send the restricted access item to the user device upon verification of the validity of the payment assurance token pair. The second part of the payment assurance token pair is added to the modified request message by the mediation system at point B and a modified request message 314 including both parts of the payment assurance token pair are sent to the host system. After receiving the payment assurance token pair, the host system verifies that the payment assurance token pair has not expired and was signed by the settlement exchange. Authentication of the signed payment assurance token pair is verified when the payment assurance token pair can be decrypted with the public key. The mediation system can be configured to provide the second part of the payment assurance token pair only when the redirect message 310 and the modified request message 312 are sent within, for example, the same TCP/IP session, thereby preventing fraudulent use of the first part of the payment assurance token pair if the first part is stolen. If the host system determines that the payment assurance token pair is valid, the host system sends a modified response message 316 including the restricted access item to the user device. In one embodiment, a payment transaction is generated by the mediation system at point C and sent to the settlement exchange to confirm that the restricted access item has been sent to the user device. The payment transaction can alternatively be sent to the settlement exchange at point B or once the user device receives the payment assurance token in the redirect message. In one embodiment, the mediation system intercepts the modified response message 316 and adds an indication of a charge to the modified response message 316 at point C, the indication of the charge informing the user of the user device that the restricted access item has been charged to the user device by the mediation system. In a non-limiting example, the indication of a charge is a hover-bar or other visual component of the modified response message 318.

Figure 4A:
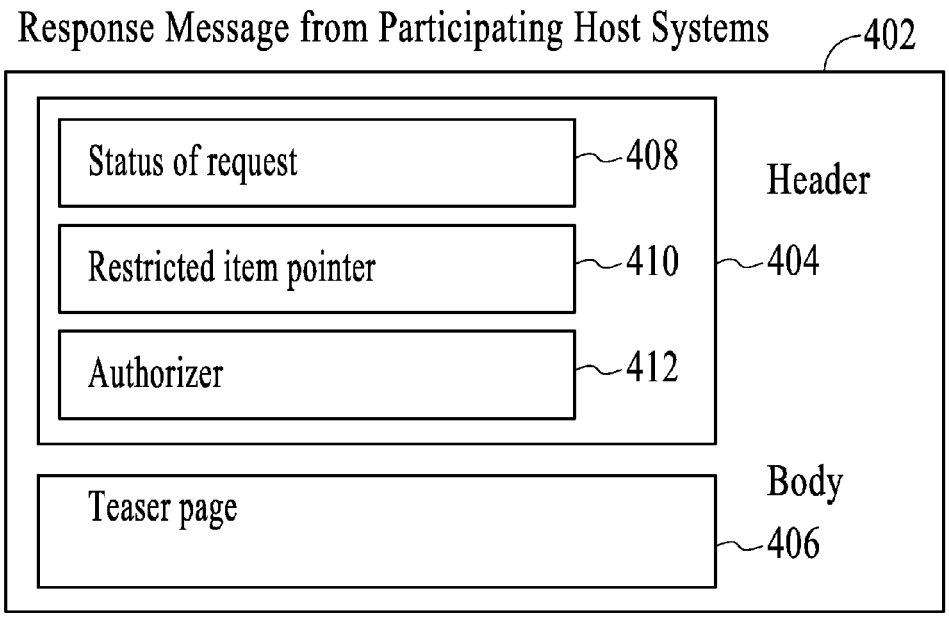
FIGS. 4A and 4B depict examples of response messages from a host system participating in the mediated marketplace service.
Figure 4B:
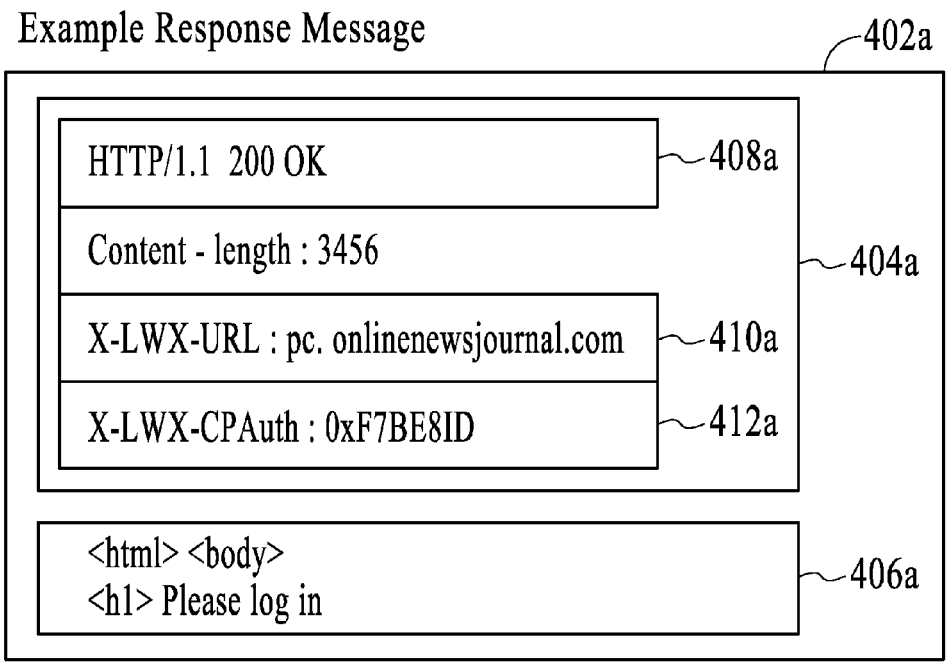

FIGS. 4A and 4B depict examples of response messages from a host system that participates in the mediated marketplace service. In the example of FIG. 4A, a response message 402 from the participating host system includes a header 404 and a body 406. The header further includes a status of the request 408 based on the request message 302, a pointer to the restricted access item 410 and an authorizer 412, as described above with reference to FIG. 2. In the example of FIG. 4, the body of the response message includes a teaser page that directs the user device to a paywall of the host system, such as a webform requiring payment to allow access to a restricted webpage. The teaser page is accessed by the user device if the authorizer is determined to be invalid (e.g., not signed by the settlement exchange or expired). FIG. 4B depicts a specific example of response message 402a from the participating host system. In this specific example, the status of the request 408a is HTTP/1.1 200 OK, indicating that the request message (in this case an HTTP request) was successful. The pointer to the restricted access item 410a is pc.onlinenewsjournal.com and the authorizer 412a is 0xF7BE81D.

In the example of FIG. 4B, the response message from the host system is in response to a request message from the user device to the host system. In one embodiment, the destination address of the request message is the same as the address given by the pointer to the restricted access item. For example, the user of the user device may have browsed to a restricted website (e.g., pc.onlinenewsjournal.com). In another embodiment, the destination address of the request message is different from the address given by the pointer to the restricted access item. For example, the user of the user device may browse to a webpage of an online journal (e.g., www.onlinenewsjournal.com). The host system of the website of the online journal, in a non-limiting example, provides a first webpage to user devices that do not participate in the mediated marketplace service (e.g., the originally requested webpage www.onlinenewsjournal.com), but provides a second webpage to user devices that participate in the mediated marketplace service (e.g., pc.onlinenewsjournal.com). The originally requested webpage may contain a paywall to access the second webpage.

Figure 5A:
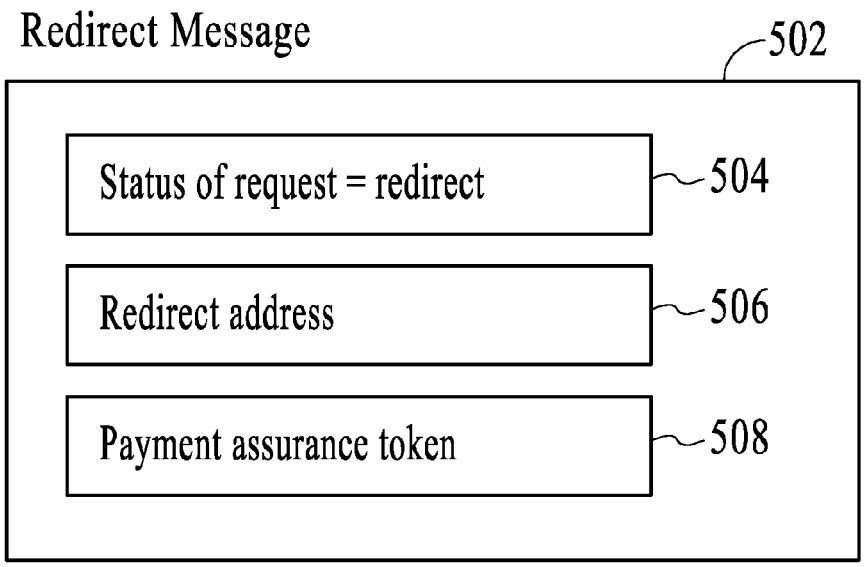
FIGS. 5A and 5B depict examples of redirect messages generated by the mediation system.
Figure 5B:
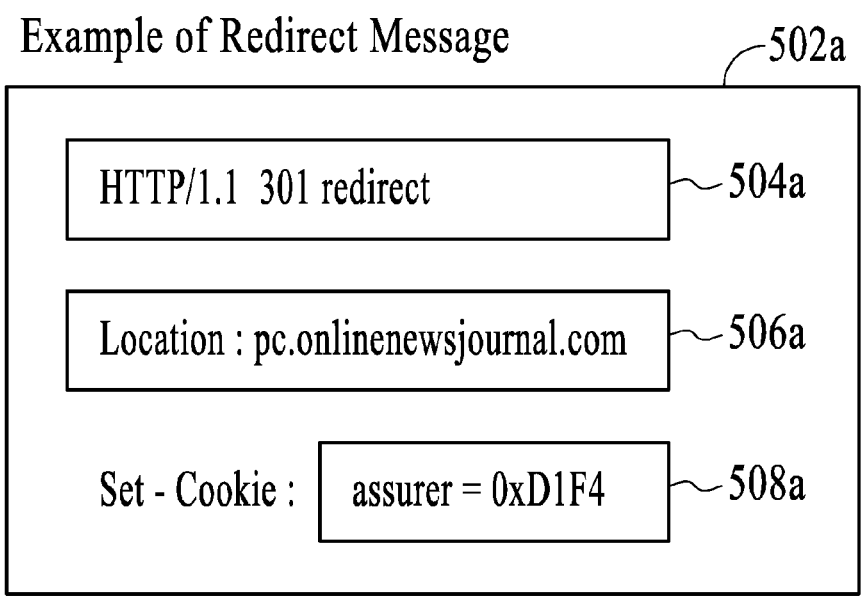

FIGS. 5A and 5B depict examples of redirect messages generated by the mediation system as a result of the mediation system receiving a response message including an authorizer and determining that the authorizer is valid. In the example of FIG. 5A, the redirect message 502 includes a redirect status of the request 504, a redirect address 506, and a payment assurance token 508, as described above with reference to FIG. 2. FIG. 5B further depicts a specific example of a redirect message 502a. In this example, the redirect status 504a is HTTP/1.1 301 redirect, which redirects a request message that triggered the response message to a location given by the redirect address 506a, which in this example is pc.onlinenewsjournal.com. The redirect message 502a further includes a payment assurance token (assurer) 508a, which is provided as a cookie and has the value of assurer=0xD1F4. The payment assurance token may alternatively be provided to the user device as an HTTP request parameter or by means other than a cookie.

Figure 6A:
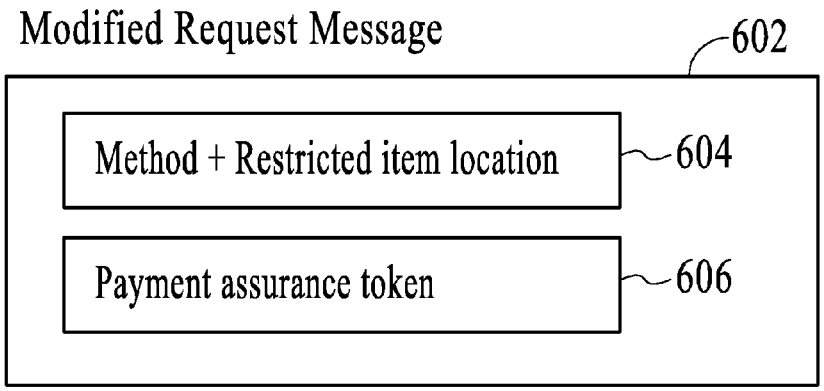
FIGS. 6A and 6B depict examples of modified request messages transmitted from the user device to the mediation system.
Figure 6B:
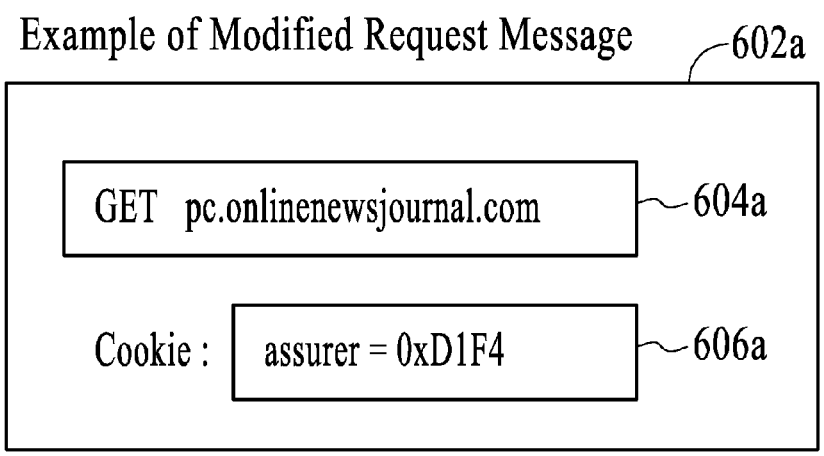

FIGS. 6A and 6B depict examples of modified request messages transmitted from the user device 102 to the mediation system 110. In the example of FIG. 6A, the modified request message 602 includes a field 604 containing a method and a restricted access item location and the modified request message further includes a field 606 containing a payment assurance token. FIG. 6B further depicts a specific example of a modified request message 602*a* including a field 604*a* containing an HTTP GET method and indicating the restricted access item location as being pc.on-linenewsjournal.com. The modified request message 602*a* further includes a cookie 604*a* set to the value of assurer=0xD1F4.

Figure 7A:
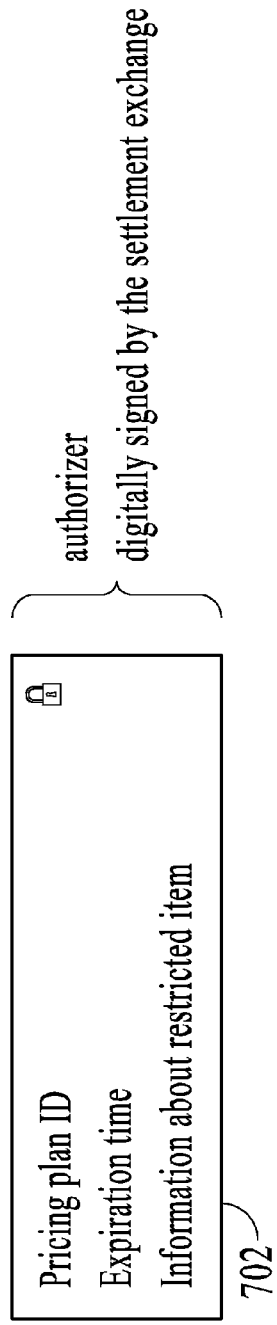
FIGS. 7A and 7B depict an example of information included in an authorizer and a payment assurance token.
Figure 7B:
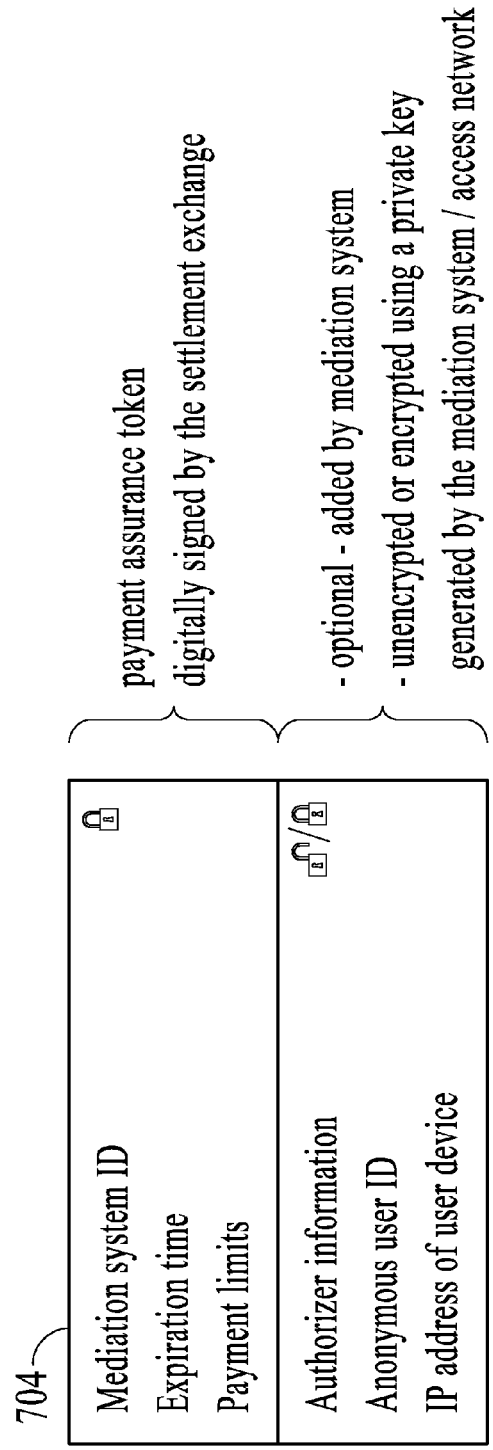

FIGS. 7A and 7B depict an example of information included in an authorizer 702 and a payment assurance token 704. In the example of FIG. 7A, the authorizer is digitally signed by the settlement exchange by encrypting the authorizer using a private key that is kept secret. The authorizer, when decrypted with the public key of the public/private key pair, reveals information about the host system and the restricted access item that the authorizer pertains to. Examples of information contained in the authorizer are: a pricing plan identification, the expiration time of the authorizer, and information about the restricted access item. The pricing plan identification is unique to the host system and allows the mediation system to determine whether a purchase confirmation (as described with reference to FIG. 3) is required. The expiration time indicates to the host system when a new authorizer, with a later expiration time, should be fetched from the settlement exchange. Alternatively, the settlement exchange may keep track of the expiration time of the authorizer and supply the new authorizer after the expiration time has passed. In an embodiment, the settlement exchange only provides the new authorizer if the host system still participates in the mediated marketplace service and is in good standing with the settlement exchange (e.g., the sum of accepted payment assurance tokens does not exceed the security deposit of the host system). The information about the restricted access item may include detailed pricing information, size of the restricted access item or any other information pertaining to the restricted access item.

In the example of FIG. 7B, the payment assurance token 704 is digitally signed by the settlement exchange and includes a mediation system identification, an expiration time of the payment assurance token, and/or payment limits for the mediation system. The mediation system identification allows the settlement exchange to ensure that the mediation system that uses the payment assurance token will be charged for the restricted access item that is bought by the user device via the mediated marketplace service. The expiration time indicates to the mediation system when a new payment assurance token should be fetched from the settlement exchange. The expiration time further allows the host system to determine if the mediation system is in good standing with the settlement exchange (i.e., the sum of supplied payment assurance tokens does not exceed the deposit given to the settlement exchange by the mediation system).

The mediation system can add further information to the payment assurance token 704, such as information about the authorizer that triggered the transmission of the payment assurance token from the mediation system to the user device. The mediation system may further add a unique anonymous user identification to the payment assurance token for analytics or other purposes. In one embodiment, the further information includes the IP address of the user device that requested the restricted access item in order to ensure that the restricted access item is sent to the correct user device. The further information can be unencrypted or can be encrypted using a private key of the mediation system, such that only the mediation system can alter the further information.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital versatile disk (DVD).

Figure 8:
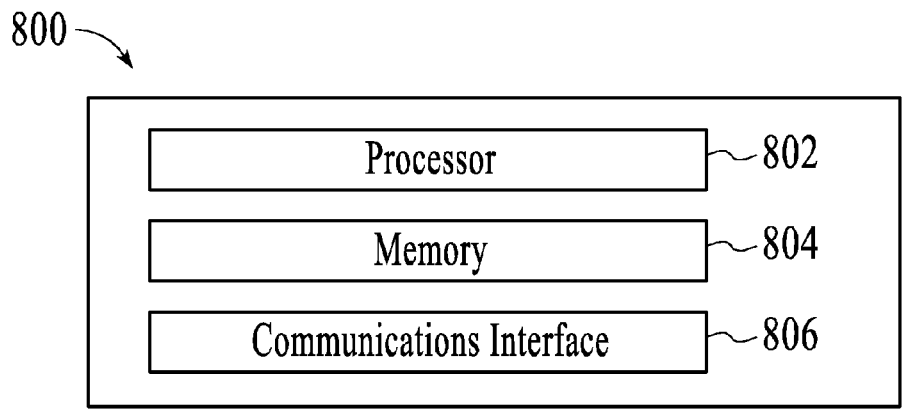
FIG. 8 depicts a computer that includes a processor, memory, and a communications interface.

In an embodiment, the functionality of at least some of the components depicted in FIGS. 1-7 is performed by a computer that executes computer readable instructions. FIG. 8 depicts a computer 800 that includes a processor 802, memory 804, and a communications interface 806. For example, the mediation system 106 and/or the settlement exchange may be implemented in hardware and/or software and are, in a non-limiting example, implemented in a server, such as a file server, database server, web server or any other type of dedicated or shared server. The processor may include a multifunction processor and/or an application-specific processor. Examples of processors include the PowerPC™ family of processors by IBM and the x86 family of processors by Intel. The memory within the computer may include, for example, storage medium such as read only memory (ROM), flash memory, RAM, and a large capacity permanent storage device such as a hard disk drive. The communications interface enables communications with other computers via, for example, the Internet Protocol (IP). The computer executes computer readable instructions stored in the storage medium to implement various tasks as described above.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for facilitating payment from a user device for a restricted access item hosted by a host system, the method comprising:
    intercepting, at a mediation system in an access network, a response message that is sent from the host system and designated for the user device, the access network providing a communications interface for the user device to access the Internet, the response message being initiated in response to a request message sent from the user device to the host system, the response message including an authorizer that is encrypted and a pointer related to the restricted access item that leads the user device to a paywall of the host system, the pointer identifying a first URL of the restricted access item, the first URL corresponding to a paywall of the host system, the request message being related to the restricted access item hosted by the host system, the mediation system comprising a processor and memory;
    determining, at the mediation system in the access network, whether the host system participates in a mediated marketplace service by decrypting the authorizer and checking the authorizer for validity, wherein a valid authorizer indicates that the host system participates in the mediated marketplace service;
    generating, at the mediation system in the access network, a URL redirect message designated for the user device in response to the determination that the host system participates in the mediated marketplace service, the URL redirect message including a redirect address that bypasses the paywall of the host system and a payment assurance token, the redirect address being related to the restricted access item hosted by the host system but different from the pointer of the response message, the redirect address identifying a second URL of the restricted access item, the second URL being different from the first URL, the second URL corresponding to the mediated marketplace service, and the payment assurance token indicating whether the host system will get paid for the restricted access item; and
    sending the redirect message from the access network to the user device;
    wherein the payment assurance token in the redirect message enables the user device to receive the restricted access item from the host system if the payment assurance token indicates that the host system will receive a financial compensation for the restricted access item.

2. The method of claim 1, wherein the request message includes a request for the restricted access item.

3. The method of claim 2, wherein the request for the restricted access item is transparent to the user device, whereby the restricted access item is selected by the user device by browsing to a webpage of the host system.

4. The method of claim 1, wherein the authorizer includes a price for the restricted access item, wherein the payment assurance token is provided by a settlement exchange, wherein the payment assurance token is used by the host system to claim the financial compensation, wherein the financial compensation is equal to or less than the price for the restricted access item.

5. The method of claim 2, wherein the payment assurance token is provided by a settlement exchange.

6. The method of claim 5, wherein the payment assurance token is cryptographically signed by the settlement exchange using a private key of a public/private key pair, and further wherein the public key of the public/private key pair validates the payment assurance token.

7. The method of claim 5, wherein the payment assurance token includes an expiration time and the payment assurance token is cryptographically signed by the settlement exchange using a private key of a public/private key pair, and further wherein the public key of the public/private key pair and the expiration time validate the payment assurance token.

8. The method of claim 1, wherein the authorizer is provided by a settlement exchange, wherein the authorizer is cryptographically signed by the settlement exchange using a private key of a public/private key pair, and further wherein the public key of the public/private key pair validates the payment assurance token.

9. The method of claim 1, wherein the authorizer is provided by a settlement exchange, wherein the authorizer includes an expiration time and the authorizer is cryptographically signed by the settlement exchange using a private key of a public/private key pair, and further wherein the public key of the public/private key pair and the expiration time validate the authorizer.

10. The method of claim 5 further comprising, at the access network, charging the user device for receipt of the restricted access item and providing a first payment to the settlement exchange for the restricted access item, wherein the settlement exchange provides a second payment to the host system.

11. The method of claim 10, wherein the first payment is equal to or larger than the second payment and wherein the second payment is smaller than or equal to the charge to the user device for the restricted access item.

12. The method of claim 1 wherein the pointer of the response message identifies a first location of the restricted access item and the redirect address of the redirect message identifies a second location of the restricted access item, which is different from the first location.

13. The method of claim 1 wherein the pointer of the response message identifies a first URL of the restricted access item and the redirect address of the redirect message identifies a second URL of the restricted access item, which is different from the first URL.

14. The method of claim 13 wherein the first URL corresponds to a paywall and the second URL corresponds to the mediated marketplace service.

15. The method of claim 1 wherein the access network provides a communications interface for the user device to access the Internet.

16. The method of claim 1 wherein the mediation system is in a data path of communications between the host system and the user device.

17. A mediation system for facilitating payment from a user device for a restricted access item hosted by a host system, the mediation system comprising:
    a processor; and
    memory that stores computer executable code, which when executed by the processor cause the mediation system to perform the steps of:
    intercepting, at a mediation system in an access network, a response message that is sent from the host system and designated for the user device, the access network providing a communications interface for the user device to access the Internet, the response message being initiated in response to a request message sent from the user device to the host system, the response message including an authorizer that is encrypted and a pointer related to the restricted access item that leads the user device to a paywall of the host system, the pointer identifying a first URL of the restricted access item, the first URL corresponding to a paywall of the host system, the request message being related to the restricted access item hosted by the host system, the mediation system comprising a processor and memory;

determining, at the mediation system in the access network, whether the host system participates in a mediated marketplace service by decrypting the authorizer and checking the authorizer for validity, wherein a valid authorizer indicates that the host system participates in the mediated marketplace service;

generating, at the mediation system in the access network, a URL redirect message designated for the user device in response to the determination that the host system participates in the mediated marketplace service, the URL redirect message including a redirect address that bypasses the paywall of the host system and a payment assurance token, the redirect address being related to the restricted access item hosted by the host system but different from the pointer of the response message, the redirect address identifying a second URL of the restricted access item, the second URL being different from the first URL, the second URL corresponding to the mediated marketplace service, and the payment assurance token indicating whether the host system will get paid for the restricted access item; and sending the redirect message from the access network to the user device;

wherein the payment assurance token in the redirect message enables the user device to receive the restricted access item from the host system if the payment assurance token indicates that the host system will receive a financial compensation for the restricted access item.

* * * * *